July 2, 1968  YOICHI HIROKAWA  3,391,318
CONTROL DEVICE FOR STEP MOTORS
Filed Aug. 11, 1965
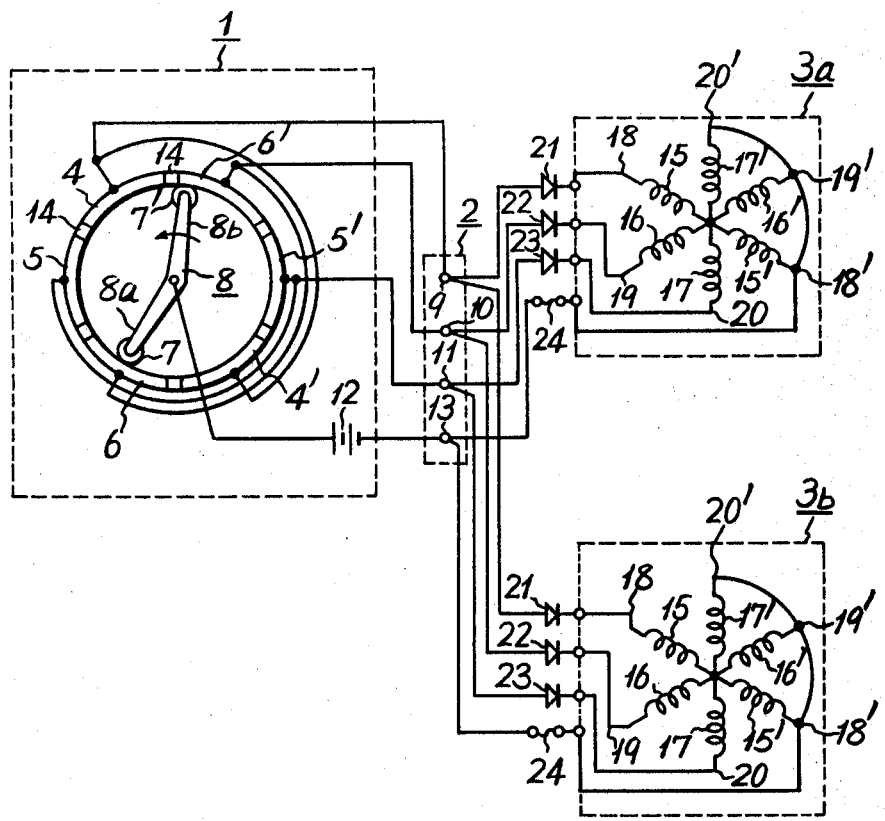
INVENTOR.
Yoichi Hirokawa
BY Hill, Sherman, Meroni, Gross & Simpson
ATTORNEYS

United States Patent Office 3,391,318
Patented July 2, 1968

---

3,391,318
CONTROL DEVICE FOR STEP MOTORS
Yoichi Hirokawa, Kamakura-shi, Japan, assignor to Kabushikikaisha Tokyo Keiki Seisakusho (Tokyo Keiki Seizosho Co. Ltd.), Tokyo, Japan, a corporation of Japan
Filed Aug. 11, 1965, Ser. No. 478,955
Claims priority, application Japan, Aug. 17, 1964, 39/65,029
1 Claim. (Cl. 318—112)

ABSTRACT OF THE DISCLOSURE

The invention is directed to a control device for operating step motors from a common controller. A plurality of step motors are connected to the controller in parallel therewith such that a malfunction of one of the step motors will not affect the operation of the other step motors. A DC power source is connected to a plurality of windings of the step motors through a plurality of unidirectional current flow elements connected in series with each of the windings so as to drive each of the step motors independently of the other.

---

This invention relates to a control device for step motors, more particularly to a control device in which a plurality of step motors connected in parallel relation are controlled by a single controller in common thereto.

It is a primary object of this invention to provide a common control device for a plurality of step motors which is suitable for use in remote indication of angle or the like in, for example, gyrocompasses.

It is another object of this invention to provide a common control device for a plurality of step motors in which even if any one of the step motors is out of order due to, for example, short-circuiting, the other remaining step motors can continue their operation.

Other objects, features and advantages of this invention will appear from the following description taken in conjunction with the accompanying sheet of drawing, which schematically illustrates one preferred form of the common control device for a plurality of step motors according to this invention.

Referring to the drawing, one embodiment of this invention will hereinafter be described.

Reference numeral 1 indicates a common controller, 2 its output terminal assembly and 3a and 3b step motors to be controlled by the common controller 1.

The common controller 1 comprises a plurality of pairs of insulated segment electrodes 4 and 4', 5 and 5', 6 and 6', each pair of the segment electrodes being arranged opposite on the periphery of a circle at equiangular intervals, and a rotor 8 the two arms 8a and 8b of which have a pair of roller electrodes 7 and 7' rotatable in sliding contact with the segment electrodes. The respective segment electrodes 4 and 4', 5 and 5', 6 and 6' confronting along a diameter of the circle are connected to each other and then connected respectively to terminals 9, 10 and 11 of the output terminal assembly 2. The rotor 8 is connected to the positive electrode of a DC power source 12, the negative electrode of which is connected to a common terminal 13. Reference numeral 14 identifies insulators for insulating the adjacent segment electrodes. The arms 8a and 8b of the rotor 8 extend in opposite directions substantially along a diameter of the circle but they are slightly bent in the plane of rotation thereof as illustrated. That is, the rotor 8 is formed in a manner so that when one roller electrode, for example, 7' stays midway between the segment electrodes 4 and 6' the other roller electrode 7 lies at substantially the center of the segment electrode 6. When the rotor 8 rotates in the anticlockwise direction as shown by the arrow, voltage of the DC power source 12 appears sequentially between the common terminal 13 and each of the terminals 9, 10 and 11 and during the switching two adjacent terminals among the terminals 9, 10 and 11 are temporarily connected to the DC power source 12.

The step motors 3a and 3b are exactly the same in structure. Reference numerals 15, 15', 16, 16', 17 and 17' designate windings, and the windings 15 and 15', 16 and 16', 17 and 17' are connected to each other respectively.

In the present invention outer ends 18, 19 and 20 of the windings 15 and 15', 16 and 16', 17 and 17' are connected respectively to the output terminals 9, 10 and 11 of the common controller 1, while the other ends 18', 19' and 20' are connected to the common terminal 13, thereby connecting to the controller 1 the step motors 3a and 3b in parallel to each other. Respectively between the ends 18, 19, 20 and the terminals 9, 10, 11, there are provided unidirectional conductive elements such, for example, as diodes 21, 22 and 23 in such a connection that currents will flow to the respective step motors. Reference numeral 24 identifies a fuse interposed between the common terminal 13 and the other ends 18', 19' and 20' of the windings of each of the step motors.

With such an arrangement as described above, when the rotor 8 lies at a position such as illustrated voltage appears between the terminals 10 and 13, energizing the windings 16 and 16' alone of each step motor. When the rotor 8 travels further in the counterclockwise direction, the rotor 8 moves in contact with both of the segment electrodes 4 and 6 to excite the windings 15, 15' and 16, 16' of the step motors simultaneously, thereafter coming in contact with the confronting segment electrodes 4 and 4' thereby to excite the windings 15 and 15'. The step motors 3a and 3b are thus turned in the anticlockwise direction. In this manner, the step motors 3a and 3b rotate in response to the rotation of the rotor 8, so that the step motors can be controlled by the common controller 1.

If any windings of one of the step motors are short-circuited by some cause, a fuse will blow thereby to protect the step motor and to maintain normal operation of the other step motors by the diodes 21, 22 and 23. That is, in the case where the windings 16 and 16' of, for example, the step motor 3a are short-circuited, the fuse blows and the step motor 3a is thereby protected as above described. In the absence of the diodes 21, 22 and 23, however, since the other ends 18', 19' and 20' of the windings are connected together, voltage also appears in the terminals 9 and 11 through the terminal 10, the shorted point of the windings 16 and 16' of the step motor 3a and the windings 15, 15' and 17, 17'. As a result of this, all the windings of the step motor 3b which is in order are also energized and its normal operation cannot be accomplished. In the present invention, however, since the diodes 21, 22 and 23 are provided, the current does not flow to the terminal 9 or 11 from the winding 15 or 17 in the above example. Therefore, there is not produced any voltage in the terminals 9 and 11 and the step motor 3b continues its normal operation.

It appears possible to provide fuses respectively in the circuits of the windings 15 and 15', 16 and 16', 17 and 17' of each step motor in place of the diodes 21, 22 and 23.

In this case, however, troubles frequently occur in use due to bad contact between the fuses and their holders and such fuses and holders are inevitably larger in size than the diode. According to this invention step motors can be controlled by a single controller in common thereto without accompanying such a disadvantage. In some cases the aforementioned fuses can be dispensed with and in such a case, if short-circuiting is caused to occur in any windings of one of the step motors, the diode provided in the circuit of the shorted windings will be broken down, making the step motor inoperative but protecting the other from damage.

The foregoing description has been made in connection with the case where two step motors connected in parallel are controlled in common thereto, but a desired number of step motors more than two can of course be controlled. In practice, more than thirty step motors are often employed in, for example, a repeater compass of big ships. In this case, since the current flowing through the segment electrodes and the roller electrodes increases with an increase in the number of the step motors, amplifiers of any desired type such, for example, as transistors or semiconductor control rectifiers may be provided between the controller 1 and the output terminal assembly 2. Furthermore, the three-phase step motor described and illustrated herein are intended as being illustrative and not as limiting the invention specifically thereto.

It will be apparent that many modifications and variations may be effected without departing from the scope of the novel concepts of this invention.

What is claimed is:

1. A control system for simultaneous operation of a plurality of step motors comprising: a controller having a rotor; a plurality of output terminals corresponding to the angular position of said rotor and a common output terminal for producing direct current voltage pulses sequentially in response to the rotation of said rotor; a plurality of windings associated with each of said plurality of step motors, one end of each of said windings of each of said step motors being connected together and to said common output terminal, a fuse being connected in series with said one end of each of said windings of each of said step motors and with said common output terminal, a unidirectional conductive element connected in series with each of said windings and coupling each of said windings to one of said plurality of output terminals whereby a malfunction of one of said plurality of step motors is prevented from affecting the operation of the other step motors due to the blocking action of said unidirectional conduction elements associated with the malfunctioned motor.

References Cited

UNITED STATES PATENTS

| | | | |
|---|---|---|---|
| 2,424,843 | 7/1947 | Owsley | 310—49 X |
| 2,725,512 | 11/1955 | Padron | 310—49 X |
| 2,790,124 | 4/1957 | Eisele | 310—49 X |
| 2,808,556 | 10/1957 | Thomas | 310—49 X |
| 2,961,589 | 11/1960 | Ghalib et al. | 318—112 X |
| 3,225,277 | 12/1965 | Foulger | 310—49 X |
| 3,250,977 | 5/1966 | Heggen | 318—254 |
| 3,287,569 | 11/1966 | Carney | 318—138 X |
| 3,001,118 | 9/1961 | Goetz | 318—467 |
| 3,327,185 | 6/1967 | Kawada Shin-Ichi | 318—138 XR |

FOREIGN PATENTS

| | | |
|---|---|---|
| 396,855 | 8/1933 | Great Britain. |

ORIS L. RADER, *Primary Examiner.*

BENJAMIN DOBECK, *Examiner.*

G. RUBINSON, *Assistant Examiner.*